US008913986B2

(12) United States Patent
Braunecker et al.

(10) Patent No.: US 8,913,986 B2
(45) **Date of Patent: *Dec. 16, 2014**

(54) METHOD, SYSTEM, AND COMPUTER PROGRAM PRODUCT FOR TRACKING AND ACCOUNTING FOR ROAMING OF MOBILE DEVICES

(71) Applicant: AT&T Intellectual Property I, L.P., Atlanta, GA (US)

(72) Inventors: David Braunecker, Sandy Springs, GA (US); Noel Vincent Avera, Cartersville, GA (US); Ruth K. Burrell, Alpharetta, GA (US); Andrew R. Brock, Alpharetta, GA (US); David Cornett, Edgewood, KY (US); Deborah Ann Hampton, Suwanee, GA (US); Susan Jungbauer, Cumming, GA (US); Joni R. Lavalette, McKinney, TX (US); Padma Rallapalli, Duluth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,254

(22) Filed: Apr. 17, 2014

(65) Prior Publication Data

US 2014/0227995 A1 Aug. 14, 2014

Related U.S. Application Data

(63) Continuation of application No. 12/876,439, filed on Sep. 7, 2010, now Pat. No. 8,706,094.

(51) Int. Cl.
*H04M 15/00* (2006.01)
*H04M 3/42* (2006.01)
*H04W 4/24* (2009.01)

(52) U.S. Cl.
CPC ............ *H04M 15/8038* (2013.01); *H04W 4/24* (2013.01)
USPC .................... 455/406; 455/414.1; 379/114.03

(58) Field of Classification Search
CPC H04W 4/24; H04M 15/8038; H04T 2001/15; H04L 43/04; H04L 67/22
USPC .................. 455/414.1, 406, 408, 405, 414.2; 379/114.03
See application file for complete search history.

(56) References Cited

U.S. PATENT DOCUMENTS

| | | | |
|---|---|---|---|
| 5,497,412 | A | 3/1996 | Lannen et al. |
| 6,725,037 | B1 | 4/2004 | Grootwassink |
| 6,785,256 | B2 | 8/2004 | O'Neill |
| 7,031,705 | B2 | 4/2006 | Grootwassink |
| 7,058,386 | B2 | 6/2006 | McGregor et al. |
| 2003/0083991 | A1 | 5/2003 | Kikinis |
| 2003/0120594 | A1 | 6/2003 | Shaginaw et al. |

OTHER PUBLICATIONS

Brain, et al., "How Cell Phones Work", http://electronics.howstuffworks.com/cell-phone3.htm (Jul. 5, 2010).
"Roaming Tariff Tracker" (Abstract), http://www.the-infoshop.com/annual/bgp55965-tariff-tracker.html; Tariff Consultancy Ltd. (Jul. 6, 2010).
IFAST—System Identification Number (SID) Assignment Guidelines and Procedures; v2.0.3 (Jul. 2005).
Mobility Management, http:en.wikipedia.org/wiki/Mobility_management; Wikipedia (Jul. 6, 2010).

*Primary Examiner* — Nizar Sivji
(74) *Attorney, Agent, or Firm* — Parks IP Law LLC

(57) ABSTRACT

Roaming of mobile devices is tracked and accounted for automatically and accurately. Revenue records are received for at least one service provider due to roaming of mobile devices within a particular geographical area served by the at least one service provider for mobile devices that do not have a subscription for service with the service provider for the particular geographic area. Expense records are received for the service provider due to roaming of mobile devices within other geographical areas served by at least one other service provider and not served by the at least one service provider. Each of the revenue and expense records is associated with a particular mobile device and includes a code identifying a particular service provider with which the particular mobile device has a subscription and a code identifying a particular geographical area assigned to the particular mobile device. The codes identifying particular service providers and particular geographical areas assigned to the mobile devices are validated against a list of predefined service providers and predefined geographical areas. If the codes are valid, the revenue records and expense records received over a period of time are compiled and summarized.

20 Claims, 3 Drawing Sheets

RECEIVE REVENUE RECORDS DUE TO ROAMING — 310
RECEIVE EXPENSE RECORDS DUE TO ROAMING — 320
CODES IDENTIFYING SERVICE PROVIDER(S) AND CODES IDENTIFYING GEOGRAPHICAL AREAS ASSIGNED TO MOBILE DEVICES VALID? — 330
NO → REACT BASED ON CRITICALITY OF ISSUE — 350
YES → PROCESS AND SUMMARIZE RECORDS — 340
REPORT SUMMARIZED RECORDS — 360

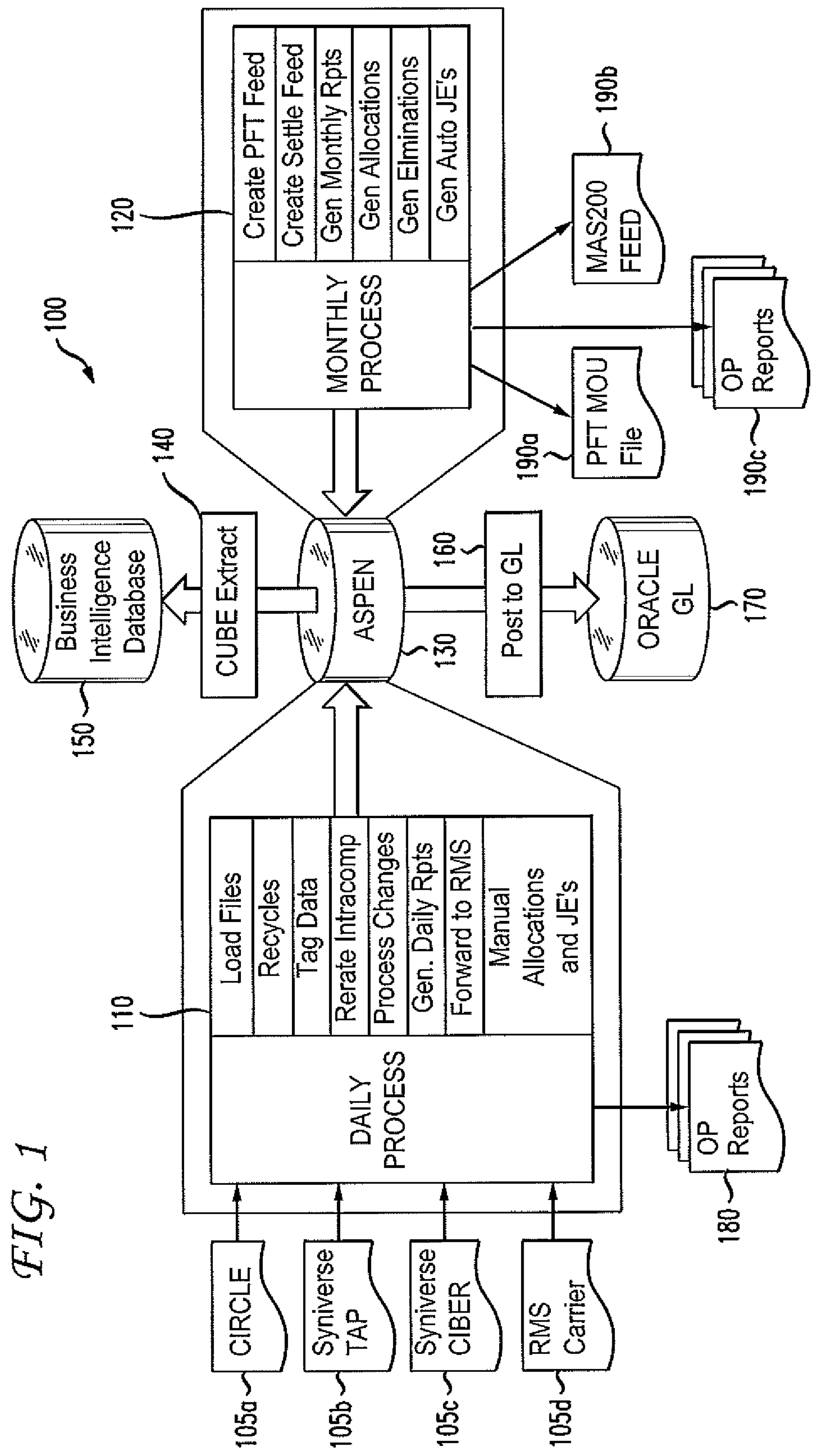
FIG. 1
100
CIRCLE
105a
Syniverse TAP
105b
Syniverse CIBER
105c
RMS Carrier
105d
DAILY PROCESS
Load Files
Recycles
Tag Data
Rerate Intracomp
Process Changes
Gen. Daily Rpts
Forward to RMS
Manual Allocations and JE's
110
OP Reports
180
ASPEN
130
CUBE Extract
140
Business Intelligence Database
150
Post to GL
160
ORACLE GL
170
MONTHLY PROCESS
Create PFT Feed
Create Settle Feed
Gen Monthly Rpts
Gen Allocations
Gen Elminations
Gen Auto JE's
120
PFT MOU File
190a
MAS200 FEED
190b
OP Reports
190c RECEIVE REVENUE RECORDS DUE TO ROAMING
310
RECEIVE EXPENSE RECORDS DUE TO ROAMING
320
330
CODES IDENTIFYING SERVICE PROVIDER(S) AND CODES IDENTIFYING GEOGRAPHICAL AREAS ASSIGNED TO MOBILE DEVICES VALID?
NO
350
REACT BASED ON CRITICALITY OF ISSUE
YES
PROCESS AND SUMMARIZE RECORDS
340
REPORT SUMMARIZED RECORDS
360

METHOD, SYSTEM, AND COMPUTER PROGRAM PRODUCT FOR TRACKING AND ACCOUNTING FOR ROAMING OF MOBILE DEVICES

TECHNICAL FIELD

The present disclosure relates generally to telecommunications, and, more particularly, to tracking and accounting for roaming of mobile devices.

BACKGROUND

Roaming has become popular for users of mobile communication devices, such as mobile phones. Users often carry their mobile devices outside of areas served by their service providers or outside of areas covered by their service plans. The roaming use of these mobile devices needs to be accounted for so that service providers providing services in various areas are adequately compensated.

Currently, the tracking and journalizing of revenue and expenses associated with both in-network roaming and out-of-network roaming is a highly manual, resource-intensive task that provides limited detailed information. As the number of users of mobile devices and the trend of roaming by such users grows, the effort in accounting for roaming charges is anticipated to become even more burdensome.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to one embodiment, a method is provided for tracking and accounting for roaming of mobile devices. Revenue records are received for at least one service provider due to roaming of mobile devices within a particular geographical area served by the at least one service provider for mobile devices that do not have a subscription for service with the at least one service provider for the particular geographical area. Expense records are received for the at least one service provider due to roaming of mobile devices within other geographical areas served by at least one other service provider and not served by the at least one service provider. Each of the revenue records and expense records is associated with a particular mobile device and includes a code identifying a particular service provider with which the particular mobile device has a subscription and a code identifying a particular geographical area assigned to the particular mobile device. The codes identifying the particular service provider and the particular geographical area are validated against a list of predefined service providers and predefined geographical areas. If the codes are valid, the revenue records and expense records received over a period of time are compiled and summarized.

According to another embodiment, a system for tracking and accounting for roaming information of mobile devices is provided. The system includes an interface for receiving revenue records for at least one service provider due to roaming of mobile devices within a particular geographical area served by the at least one service provider for mobile devices that do not have a subscription for service with the at least one service provider for the particular geographical area. The interface also receives expense records for the at least one service provider due to roaming of mobile devices within other geographical areas served by at least one other service provider and not served by the at least one service provider. Each of the revenue records and the expense records is associated with a particular mobile device and includes a code identifying a particular service provider with which the particular mobile device has a subscription and a code identifying a particular geographical area assigned to the particular mobile device. The system further includes a processor for validating the codes identifying the particular service provider and the particular geographical area against a list of predefined service providers and predefined geographical areas. If the codes are valid, the processor compiles the revenue records and expense records received over a period of time and summarizes the compiled revenue records and expense records According to another embodiment, a non-transitory computer readable medium includes instructions that, when executed by a processor, cause the processor to perform a method for tracking and accounting for roaming information of mobile devices. The method includes receiving revenue records for at least one service provider due to roaming of mobile devices within a particular geographical area served by the at least one service provider for mobile devices that do not have a subscription for service with the at least one service provider for the particular geographic area and receiving expense records for the at least one service provider due to roaming of mobile devices within other geographical areas served by at least one other service provider and not served by the at least one service provider. Each of the revenue records and the expense records is associated with a particular mobile device and includes a code identifying a particular service provider with which the particular mobile device has a subscription and a code identifying a particular geographical area assigned to the particular mobile device. The method further includes validating codes identifying the particular service provider and the particular geographical area against a list of predefined service providers and predefined geographical areas and, if the codes are valid, compiling the revenue records and expense records received over a period of time and summarizing the compiled revenue records and expense records.

BRIEF DESCRIPTION OF THE DRAWINGS

FIG. 1 illustrates an exemplary environment in which a system for tracking and accounting for roaming of mobile devices may be implemented according to exemplary embodiments.

DETAILED DESCRIPTION

Figure 2:
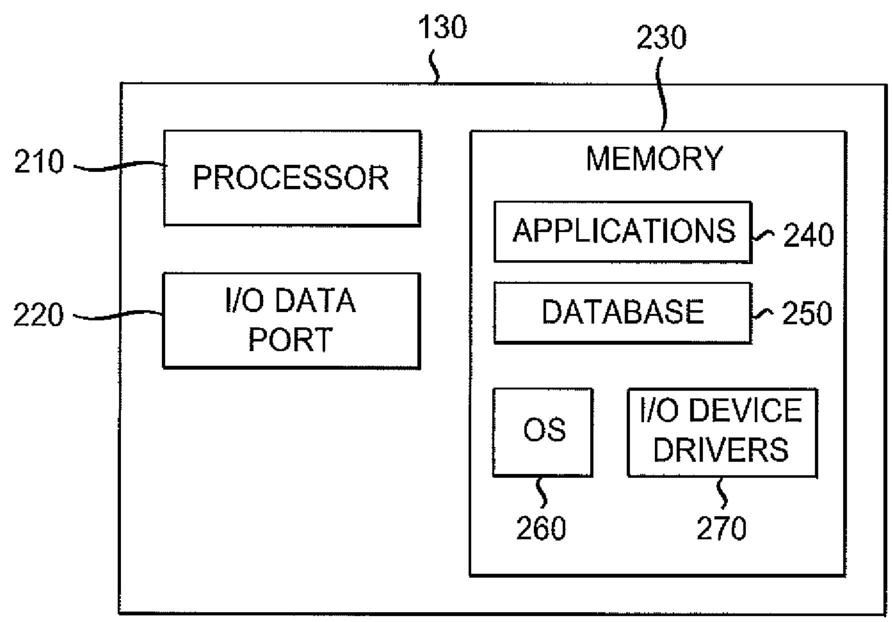
FIG. 2 illustrates a block diagram of a system for tracking and accounting for roaming of mobile devices according to an exemplary embodiment.

Detailed exemplary embodiments are disclosed herein. It must be understood that the embodiments described and illustrated are merely examples that may be embodied in various and alternative forms, and combinations thereof. As used herein, the word “exemplary” is used expansively to refer to embodiments that serve as examples or illustrations. The figures are not necessarily to scale, and some features may be exaggerated or minimized to show details of particular components. Specific structural and functional details disclosed herein are not to be interpreted as limiting.

To aid in understanding of various embodiments, it is useful to define some terminology associated with roaming of mobile devices. One such term is a System Identification Number (SID), which refers to a number or code that is assigned to identify a particular service provider (also referred to herein as a "carrier") with which a mobile device has subscribed to for communication services. This number identifies the subscriber's "home" service provider. Similarly, a Business Identification Number (BID) is a number or code assigned to a particular mobile device to identify a geographical area within which the mobile device may make and receive communications without incurring roaming charges. This area is the subscriber's "home" area. Thus, a subscriber making and receiving calls using a mobile device having service corresponding to the mobile device's assigned SID may make calls without roaming, as long as the mobile device stays within the geographical area corresponding to the BID assigned to the mobile device.

If the mobile device roams out of the area corresponding to the assigned BID, the mobile device is roaming, even if the mobile device is using the same service provider corresponding to the assigned SID. In this scenario, if the service provider handling a communication for a mobile device is the same as the SID assigned to the mobile device, this communication is referred to as "intracompany roaming". If, on the other hand, the service provider handling a communication is different than that associated with the mobile device's SID, this communication is referred to as "intercompany roaming".

Other terminology that is useful to understand is a Transferred Account Data Interchange Group (TADIG) and a Public Land Mobile Network (PLMN). A TADIG refers to a group of service providers to which the service provider providing service to a particular mobile device belongs. TADIG testing between service providers or carriers ensures that the service providers can exchange information needed for billing purposes. This testing may be done as part of the process of establishing a roaming agreement between carriers. TADIG TYPE may be used to segment traffic from different mobile/cellular technologies, e.g., GSM and CDMA, A PLMN refers to a network that is established for providing land mobile telecommunications services to the public.

It should be appreciated that the term "mobile device", as used herein, refers to any mobile device capable of communicating via service providers other than the service provider with which the mobile device has a subscription in geographical areas assigned to the mobile device and in geographical areas not assigned to the mobile device.

According to exemplary embodiment, a complete, automatic, end-to-end solution is provided for the tracking and journalizing of roaming revenue and expenses at a detailed level, e.g., at a SID/BID level and at a network technology type (e.g., TADDIG TYPE)/PLMN level. Roaming revenue and expense records are automatically loaded, validated, compiled, and summarized, as described in further detail below. Exemplary embodiments streamline processing, eliminate human error, improve auditability, provide detailed data for analysis and free up valuable resources. The detailed data provided allows for service providers to trend profitability down to a specified level, e.g., a SID/BID, within a given market across various communication services, e.g., voice and data services. In addition, exemplary embodiments enable geographic area trending, providing deeper insight into the negotiation and definition of financial terms between service providers or carriers serving various geographical areas.

FIG. 1 illustrates an environment 100 in which a system for tracking and accounting for roaming of mobile devices may be implemented. For the purposes of this disclosure, this system may be incorporated into an Accounting Subledger Processing Engine (ASPEN), identified in FIG. 1 with reference number 130. Within the ASPEN system 130 are one or more applications, referred to herein as Roamer modules, that process roaming records, e.g., on a daily basis and a monthly basis, from various clearinghouses. For ease of illustration, the Roamer modules are represented in FIG. 1 as an application 110, which runs on a daily bass, and as an application 120, which runs on a monthly basis. It should be appreciated, however, that there may be additional Roamer modules running more or less frequently. Further, although shown as two modules for ease of understanding, the Roamer modules 110 and 120 may be implemented as a single module. Further, each of the Roamer modules 110 and 120 may contain submodules for performing specific tasks, e.g., loading files, generating reports, generating journal entries, etc.

The information processed by the Roamer modules 110 and 120 is obtained from clearinghouses provided by various carriers or service providers. The clearinghouses collect records reflecting invoice data from various carriers or service providers and feed summarized invoice data of roaming customers to the Roaming modules 110 and 120. The clearinghouses depicted in FIG. 1 are examples of various clearinghouses that collect roaming data. For example, the Circle clearinghouse 105*a* may be a clearinghouse for a particular service provider, e.g., AT&T, for collecting data regarding subscribers roaming in area served by that service provider's networks that are outside of their assigned BIDs. The Syniverse clearinghouses 105*b* and 105*e* may be clearinghouses for other carriers. For example, the Syniverse TAP 105*b* clearinghouse may collect roaming data for GSM carriers that provide services to cellular phones using SIM cards. The Syniverse CIBER 105*c* clearinghouse may collect roaming data for carriers that provide service for intelligent cellular phones, e.g., CDMA carriers. The RMS Carrier clearinghouses 105*d* may provide data for every BID and data indicating which service provider provides service for each BID.

According to an exemplary embodiment, information from the various clearinghouses may be provided on a daily basis to the Roamer module 110. As part of the daily process, the Roamer module 110 loads revenue and expense records from the clearinghouses as files, and previously sent records are recycled or corrected. The information received includes TAG data identifying when a roaming event took place. The Roamer module 110 rerates intracompany roaming revenue and expenses, effectively eliminating intracompany revenue and expenses from the daily records. The Roamer module 110 processes changes to records received in a previous file. For example, a roaming record may be received for revenue of a particular amount for one day, and the next day, the record may be modified to reduce the amount of revenue. The Roamer module 110 also generates general daily reports that are summarized files from the clearinghouses used for balancing/reporting on all detail records received in a day. The Roamer module 110 may also allow for some manual allocation to adjust the daily records, e.g., if overcharges appear based on costs spread across history. Journal entries, which include the information generated by the Roamer daily module 110, are created and compiled.

The clearinghouses also provide roaming invoice data deliver traffic data to the Roamer module 120 on a monthly basis. The Roamer module 120 creates a PFT feed to track minutes of use for each roaming event (including data communications, voice communications, etc.) and a Settle Feed which includes intracarrier information sent to a third party to settle with other carriers. The Roamer module 120 also generates general monthly reports and generates general allocations and general eliminations. General allocations adjust the monthly records, e.g., if overcharges appear based on costs spread across history. According to an exemplary embodiment, general allocations are summarized by carrier, not by BID. General eliminations are generated for intranetwork roaming. The Roamer module 120 also generates general journal entries automatically. General journal entries including data generated by the Roamer module 120 are created and compiled across a month based on records from all clearinghouses.

Journal entries from the Roamer module 110 and 120 are summarized and reported at various time intervals, e.g., on a monthly basis at different times during the month, based on the settlement period of a carrier. For example, a CDMA carrier's settlement period may be from the $16^{th}$ of one month through the $15^{th}$ of another month, while a GSM carrier's settlement period may be from the $1^{st}$ of the month through the end of the month a monthly basis. These journal entries are reported to a general ledger database, e.g., Oracle General Ledger (GL) 170 via the ASPEN system 130 and an interface 160. Data reported via the interface 160 contains revenue and expense of various carriers at a GL string level. A GL string is made up of information regarding, e.g., a company, an account, a subaccount, a cost center, and a line of business. According to an exemplary embodiment, information regarding a company identifies a geographic area that either incurs expenses or gains revenue, and the account/subaccount information identifies the "call type" associated with an expense/revenue, e.g., air, toll, data, etc. This information may be viewed by business managers the carrier implementing ASPEN 130. The same data is output at a much more granular level of detail to the Business Intelligence Database 150 via a Cube Extract 140. The information output to the Business Intelligence Database 150 may include, e.g., a home BID, a serving BID, a call type, and call units (e.g., minutes, kilobytes, messages, etc.). This information is used internally by the business managers of the carrier that owns the ASPEN system 130. The Businesses Intelligence Database 150 provides low level data, while Oracle GL 170 provides high level postings, including journal entries.

The information reported by ASPEN 130 may also be fed back into the Roamer modules 110 and 120, e.g., for creating historical trends. In addition to reporting data via the ASPEN system 130, the Roamer modules 110 and 120 may output data. For example, outputs from the Roamer module 120 may include a PFT MOU File 190*a* including a summarized minutes of use (MOU) file for a serving BID, which may be used for trending/reporting purposes, e.g., for network capacity planning. An MAS200 Feed 190*b* may also be output from the Roamer module 120, containing summarized settlement data for each of a carrier's roaming partners. This information may be used to reconcile settlement numbers with actual payouts/dollars delivered to and received from the carrier's roaming partners. Daily operational (OP) reports 180 may be output from the Roamer module 110, and monthly operational (OP) reports 190*c* may be output from the Roamer module 120. These operational reports enable auditability and ensure that proper rates are applied. For example, a SID cerate reports may show initial rates by SID, along with rates calculated by the ASPEN system 130. This information may be used by business managers to ensure that proper rates are applied (especially for records involving carrier partnerships, since partners receive or are charged a percentage of revenue/cost).

FIG. 2 is a block diagram of a system for tracking and accounting for rooming revenue and expenses according to an exemplary embodiment. The system ASPEN 130 includes a processor 210 that communicates with the memory 230 via, e.g., an address/data bus. The processor 210 can be any commercially available or customer microprocessor. The memory is 230 is representative of the overall hierarchy of memory devices containing the software and data used to implement the functionality of the device 130. The memory 230 can include but is not limited to the following types of devices: processor registers, processor cache, RAM, ROM, PROM, EPROM, EEPROM, flash memory, SRAMD, DRAM other volatile memory forms, and non-volatile, semi-permanent or permanent memory types; for example, tape-based media, optical media, solid state media, hard disks, combinations thereof, and the like.

As shown in FIG. 2, the memory 230 may include several categories of software and data used in the device system, including, applications 240, a database 250, an operating system (OS) 260, and the input/output (I/O) device drivers 270 As will be appreciated by those skilled in the art, the OS 260 may be any operating system for use with a data processing system. The I/O device drivers 270 may include various routines accessed through the OS 260 by the applications 240 to communicate with devices, and certain memory components. The applications 240 can be stored in the memory 230 and/or in a firmware (not shown) as executable instructions, and can be executed by the processor 210. The applications 240 may include various programs that implement the various features of the device 130, including Roaming modules 110, 120 and a business rules application that contains predefined business rules to apply to data stored in the database 250. Examples of business rules that may be applied by the ASPEN system include determining whether a record is booked to an intracompany GL string or an intercarrier GL string based on whether the home BID is wholly owned by a particular carrier and whether the serving BID is wholly owned, divested, or not owned by the particular carrier. The applications generate data processed by the processor 210. The database 250 represents the static and dynamic data used by the applications 240, the OS 260, the I/O device drivers 270 and other software programs that may reside in the memory. The database 250 may include, for example, received roaming records, historical roaming data, generated journal entries, etc.

While the memory 230 is illustrated as residing proximate the processor 210, it should be understood that at least a portion of the memory 230 can be a remotely accessed storage system, for example, a server on a communication network, a remote hard disk drive, a removable storage medium, combinations thereof, and the like. Thus, any of the data, applications, and/or software described above can be stored within the memory 230 and/or accessed via network connections to other data processing systems (not shown) that may include a local area network (LAN), a metropolitan area network (MAN), or a wide area network (WAN), for example.

It should be understood that FIG. 2 and the description above are intended to provide a brief, general description of a suitable environment in which the various aspects of some embodiments of the present disclosure can be implemented. While the description refers to computer-readable instructions, the present disclosure also can be implemented in combination with other program modules and/or as a combination of hardware and software in addition to, or instead of, computer readable instructions. The terms "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Figure 3:
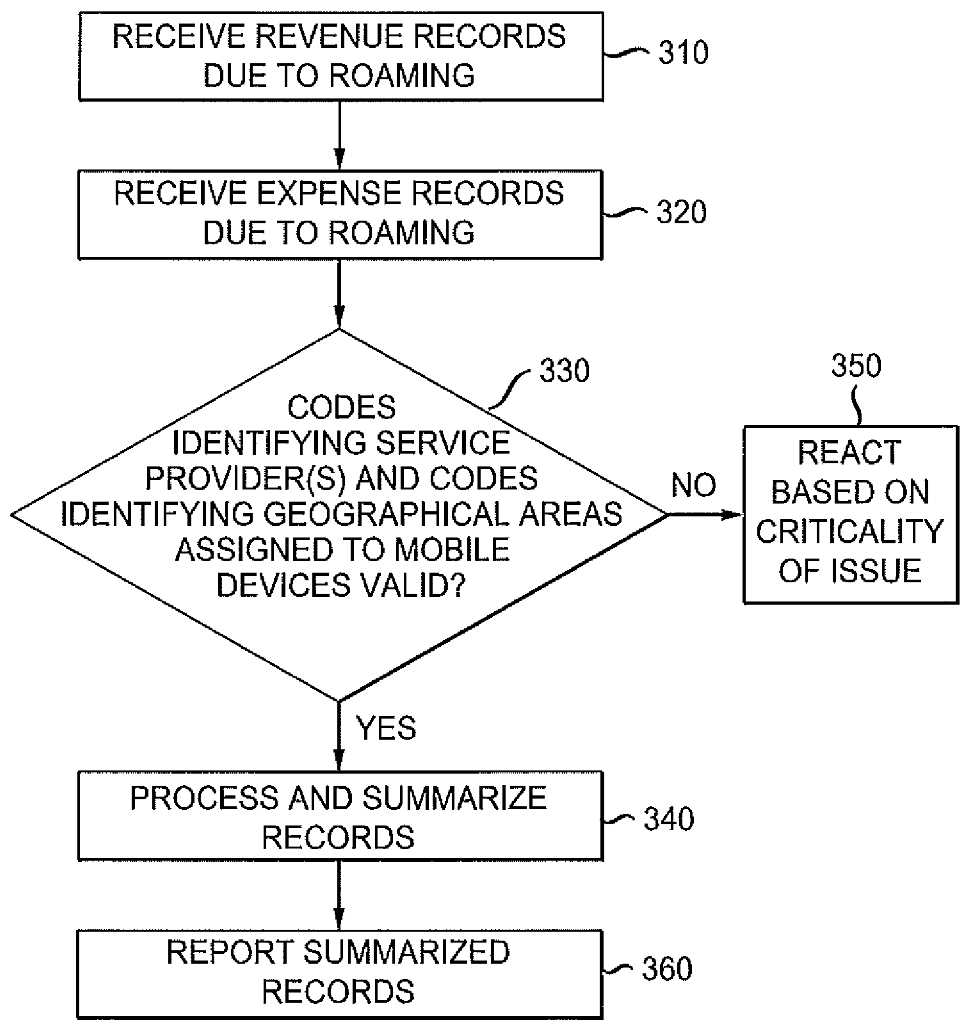
FIG. 3 is a flow chart illustrating an exemplary method for tracking and accounting for roaming of mobile devices according to an exemplary embodiment.

FIG. 3 is a flow chart illustrating a process for tracking and accounting for roaming information of mobile devices. Revenue records are received at the Roamer modules 110, 120 from clearinghouses, e.g., those represented in FIG. 1 with reference numerals 105*a*, 105*b*, 105*c*, and 105*d*, at step 310. At step 320, expense records are received at the Roamer modules 110, 120 from the clearinghouses. It should be appreciated that these records may be received on a continuous basis, a daily basis, and/or a monthly basis. Also, the records may be received in any order. For example, the revenue records may be received before, after, or at the same time as the expense records. Each of the revenue records and expense records are associated with a particular mobile device and include a code identifying the particular service provider with which that mobile device has a subscription and a code identifying a particular geographical area assigned to that mobile device. At step 330, the Roamer modules 110, 120 within the ASPEN system 130 determine whether the code identifying the particular service provider and the code identifying the particular geographical area assigned to the mobile device are valid, e.g., by comparing the codes to valid lists of predefined service providers and predefined geographical areas served by service providers. If the codes included in the records match codes included in the list, the records may be further processed by the Roamer modules 110, 120. For example, the Roamer modules 110, 120 may identify intracompany roaming expenses and revenue and eliminate these from the records to be reported. The Roamer modules also summarize the records as journal entries. The ASPEN system may perform further processing, e.g., validating that the GL string to be reported to the Oracle database is defined by the Oracle database, validating that the journal entries are in balance, etc. Once processed, the summarized records are reported a journal entries at step 360 by the ASPEN system 130. If the codes are not valid the records, actions are taken based on criticality at step 350. In some cases, the Roamer applications may shut down and require manual intervention to address invalid records. This may occur, e.g., if the clearinghouses send information for a BID for a specific carrier that the Roamer modules do not recognize as being a BID for that carrier. Other errors that may result in invalid records may be flagged and recycled, so that the process continues rather than shutting down. This may occur, e.g., if a correction record is received from a clearinghouse prior to the original record. The Roamer modules may recycle the correction record in an attempt to wait on the original clearinghouse record.

The process shown in FIG. 3 is an iterative process, performed as often as desired.

The systems, methods, and computer program products described herein may be implemented in any wireless networks that use exemplary telecommunications standards, such as Global System for Mobile communications (GSM) and Universal Mobile Telecommunications System (UMTS). It should be understood, however, that the systems, methods, and computer program products described herein may alternatively be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), WIMAX and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:

responsive to receipt of:

revenue records for a first service provider due to roaming of first mobile devices, within a first geographical area served by the first service provider, wherein the first mobile devices have a subscription for service with the first service provider, wherein the first geographical area is not assigned to the first mobile devices;

revenue records for the first service provider due to roaming of second mobile devices, within the first geographical area served by the first service provider, wherein the second mobile devices do not have a subscription for service with the first service provider; and expense records for the first service provider due to roaming of the first mobile devices within a second geographical area served by a second service provider and not served by the first service provider, wherein each of the revenue records and expense records is associated with a particular mobile device and includes a code identifying a particular service provider with which the particular mobile device has a subscription and a code identifying a particular geographical area assigned to the particular mobile device, validating, by a processor, the codes identifying the particular service provider and the particular geographical area against a list of predefined service providers and predefined geographical areas;

if the codes are valid, eliminating from the revenue records and expense records, revenue due to roaming of the first mobile devices within the first geographical area served by the first service provider, with which the first mobile devices have a subscription, wherein the first geographical area is not assigned to the first mobile devices, compiling the revenue records and expense records received over a period of time, and summarizing the compiled revenue records and expense records; and if the codes are not valid, taking actions to address the revenue records and expense records based on criticality.

2. The method of claim 1, wherein the code identifying the particular service provider with which the particular mobile device has a subscription includes a system identification code, and the code identifying the particular geographical area assigned to the particular mobile device includes a business identifying code.

3. The method of claim 1, further comprising validating a network technology type code identifying the type of network to which a particular mobile device has subscribed and a code identifying a public land mobile network code identifying the network to which the particular mobile device is assigned.

4. The method of claim 1, further comprising creating journal entries including the summarized revenue records and expense records.

5. The method of claim 4, wherein the journal entries reflect trends in revenue records and expense records received over the period of time, and wherein the journal entries enable adjustment of roaming charges based on roaming trends.

6. The method of claim 1, wherein the summarized revenue records and expense records are periodically reported.

7. The method of claim 6, wherein the summarized revenue records and expense records are periodically reported based upon settlement periods of the first service provider and the second service provider.

8. A system, comprising:

a processor; and a memory containing instructions which, when executed by the processor, cause the processor to perform operations comprising:

responsive to receipt of:

revenue records for a first service provider due to roaming of first mobile devices, within a first geographical area served by the first service provider, wherein the first mobile devices have a subscription for service with the first service provider, wherein the first geographical area is not assigned to the first mobile devices;

revenue records for the first service provider due to roaming of second mobile devices, within the first geographical area served by the first service provider, wherein the second mobile devices do not have a subscription for service with the first service provider; and expense records for the first service provider due to roaming of the first mobile devices within a second geographical area served by a second service provider and not served by the first service provider, wherein each of the revenue records and expense records is associated with a particular mobile device and includes a code identifying a particular service provider with which the particular mobile device has a subscription and a code identifying a particular geographical area assigned to the particular mobile device, validating the codes identifying the particular service provider and the particular geographical area against a list of predefined service-providers and predefined geographical areas;

if the codes are valid, eliminating, from the revenue records and expense records, revenue due to roaming of the first mobile devices within the first geographical area served by the first service provider, with which the first mobile devices have a subscription, wherein the first geographical area is not assigned to the first mobile devices, compiling the revenue records and expense records received over a period of time and summarizing the compiled revenue records and expense records; and if the codes are not valid, take actions to address the revenue records and expense records based on criticality.

9. The system of claim 8, wherein the code identifying the particular service provider with which a particular mobile device has a subscription includes a system identification code, and the code identifying the particular geographical area assigned to the particular mobile device includes a business identifying code.

10. The system of claim 8, wherein validating includes validating a network technology type code identifying the type of network to which a particular mobile device has subscribed and a code identifying a public land mobile network code identifying the network to which the particular mobile device is assigned.

11. The system of claim 8, wherein the memory further contains instructions which, when executed by the processor, cause the processor to create journal entries including the summarized revenue records and expense records.

12. The system of claim 11, wherein the journal entries reflect trends in revenue records and expense records received over the period of time, and wherein the journal entries enable adjustment of roaming charges based on roaming trends.

13. The system of claim 8, wherein the summarized revenue records and expense records are periodically reported based upon settlement periods of the first service provider and the second service provider.

14. A non-transitory computer readable medium including instructions that, when executed by a processor, cause the processor to perform operations, comprising:

responsive to receipt of:

revenue records for a first service provider due to roaming of first mobile devices, within a first geographical area served by the first service provider, wherein the first mobile devices have a subscription for service with the first service provider, wherein the first geographical area is not assigned to the first mobile devices;

revenue records for the first service provider due to roaming of second mobile devices, within the first geographical area served by the first service provider, wherein the second mobile devices do not have a subscription for service with the first service provider; and expense records for the first service provider due to roaming of the first mobile devices within a second geographical area served by a second service provider and not served by the first service provider, wherein each of the revenue records and expense records is associated with a particular mobile device and includes a code identifying a particular service provider with which the particular mobile device has a subscription and a code identifying a particular geographical area assigned to the particular mobile device, validating the codes identifying the particular service provider and the particular geographical area assigned to the particular mobile device against a list of predefined service providers and predefined geographical areas;

if the codes are valid, eliminating, from the revenue records and expense records, revenue due to roaming of the first mobile devices within the first geographical area served by the first service provider, with which the first mobile devices have a subscription, wherein the first geographical area is not assigned to the first mobile devices, compiling the revenue records and expense records received over a period of time, and summarizing the compiled revenue codes and expense records; and if the codes are not valid, take actions to address the revenue records and expense records based on criticality.

15. The non-transitory computer readable medium of claim 14, wherein the code identifying the particular service provider with which the particular mobile device has a subscription includes a system identification code, and the code identifying the particular geographical area assigned to the particular mobile device includes a business identifying code.

16. The non-transitory computer readable medium of claim 14, wherein the instructions further cause the processor to validate a network technology type code identifying the type of network to which a particular mobile device has subscribed and a code identifying a public land mobile network code identifying the network to which the particular mobile device is assigned.

17. The non-transitory computer readable medium of claim 14, wherein the instructions further cause the processor to create journal entries including the summarized revenue records and expense records.

18. The non-transitory computer readable medium of claim 17, wherein the journal entries reflect trends in revenue records and expense records received over the period of time, and wherein the journal entries enable adjustment of roaming charges based on roaming trends.

19. The non-transitory computer readable medium of claim 14, wherein the summarized revenue records and expense records are periodically reported.

20. The non-transitory computer readable medium of claim 19, wherein the summarized revenue records and expense records are periodically reported based upon settlement periods of the first service provider and the second service provider.

* * * * *